United States Patent

Zhu et al.

[11] Patent Number: 6,069,664
[45] Date of Patent: May 30, 2000

[54] METHOD AND APPARATUS FOR CONVERTING A DIGITAL INTERLACED VIDEO SIGNAL FROM A FILM SCANNER TO A DIGITAL PROGRESSIVE VIDEO SIGNAL

[75] Inventors: Daniel Qiang Zhu, Columbus; Kaarlo Juhani Hamalainen, Medford; Thomas James Leacock, Medford; Kevin John Stec, Medford, all of N.J.

[73] Assignee: Matsushita Electric Industrial Co., Ltd., Osaka, Japan

[21] Appl. No.: 08/869,274

[22] Filed: Jun. 4, 1997

[51] Int. Cl.[7] .................................................... H04N 7/01
[52] U.S. Cl. ..................... 348/448; 348/441; 348/446; 348/458; 348/459
[58] Field of Search ................................ 348/446, 447, 348/448, 449, 450, 451, 452, 441, 443, 458, 459, 581, 453, 571, 640, 445; H04N 7/01

[56] References Cited

U.S. PATENT DOCUMENTS

| | | | |
|---|---|---|---|
| 5,309,235 | 5/1994 | Naimpally . | |
| 5,430,487 | 7/1995 | Naimpally . | |
| 5,485,280 | 1/1996 | Fujinami et al. . | |
| 5,497,199 | 3/1996 | Asada | 348/448 |
| 5,510,902 | 4/1996 | Fujinami | 348/97 |
| 5,610,661 | 3/1997 | Bhatt | 348/448 |
| 5,796,437 | 8/1998 | Muraji | 348/452 |
| 5,812,204 | 9/1998 | Baker | 348/441 |
| 5,822,008 | 10/1998 | Inoue | 348/446 |
| 5,847,772 | 12/1998 | Wells | 348/571 |

Primary Examiner—Mark R. Powell
Assistant Examiner—Wesner Sajous
Attorney, Agent, or Firm—Ratner & Prestia

[57] ABSTRACT

The present invention is embodied in an apparatus and method for converting a progressive video signal to an interlaced video signal from which the progressive video signal may be recovered. The invention is further embodied in an apparatus and method for converting such an interlaced video signal to a progressive video signal. A progressive-to-interlaced video converter includes a progressive video preprocessor and a converter. The progressive video preprocessor replaces at least one scan line in a video frame by its preceding or succeeding scan line. Alternatively, the preprocessor may assign a predetermined value to one or multiple scan lines at appropriate position(s) in a frame. In either scenario, each frame will carry at least one redundant scan line. The frame modification information will be encoded to an ancillary data section of a digital video stream. An interlaced-to-progressive video converter includes an ancillary data preprocessor, a recursive interlaced-to-progressive converter and two digital standards converters. The preprocessor decodes original frame modification information from the ancillary data section of a digital video stream and provides decoding parameters to the interlaced-to-progressive converter. A digital standards converter is used to convert the resulting 24-frame-per-second progressive video signal to a 60-frame-per-second progressive video signal using a 3:2 pull down. A second digital standards converter is also used to produce a 30-frame-per-second interlaced video signal by repeating every 5th field of the 24-frame-per-second interlaced video input.

16 Claims, 11 Drawing Sheets

METHOD AND APPARATUS FOR CONVERTING A DIGITAL INTERLACED VIDEO SIGNAL FROM A FILM SCANNER TO A DIGITAL PROGRESSIVE VIDEO SIGNAL

FIELD OF THE INVENTION

The present invention relates to a method and apparatus for converting video signals from one format to another format and, particularly, to a method and apparatus for converting a digital progressive video signal to a digital interlaced video signal and back to a digital progressive video signal.

BACKGROUND OF THE INVENTION

Recently, the progressive scan video format has gained increasing popularity in television broadcasting as well as consumer electronic industries, especially for the proposed 525 progressive (525p) format system. The 525p format system approximately doubles the vertical resolution of the NTSC signal and may be made compatible with the existing 525 interlaced (525i) format system. The 525p format system also provides a near high-definition (HD) picture quality with only a fraction of the transmission bandwidth needed by a high-definition television (HDTV) signal. One example of such a near HD quality video signal is the video signal generated from a progressively scanned film material with 525 vertical scan lines.

A telecine system is commonly used for transferring motion picture film to magnetic recording medium. One such telecine system is a Frame Interline Transfer (Fri) CCD film scanner. Other examples of film-to-tape transfer systems are described in *HDTV Advanced Television for the 1990s* by Benson and Fink (1991), which is herein incorporated by reference (see Chapter 13). The video signals produced by most telecine systems are interlaced in order to be compatible with the existing interlaced video equipment (though they are capable of generating progressive ones). Once the video signal is in interlaced format, the vertical resolution of the signal is reduced to half of that of the progressive video format. Although there are ways to up-convert an interlaced video signal (IVS) to a progressive video signal (PVS), the conversion equipment is often expensive and the quality is not nearly as good as that of the original progressive counterpart.

FIG. 12 is a block diagram of a typical telecine system for producing a progressive video signal from a motion picture film and for converting the progressive video signal to an interlaced video signal. The system includes the continuous projector 2, a CCD camera 3, and a digital standards converter 4. The system(1) scans a 24-frame-per-second motion picture film through a continuous projector 2 to generate a progressive video signal at the same frame rate; (2) temporarily stores each frame in a digital memory; and (3) retrieves the signal from the memory at a 60-field-per-second rate (in NTSC) through a digital standards converter 4 which performs a 2:1 vertical scan line decimation (e.g., scan line averaging) and a 3-2 pull down operation on the resultant even and odd fields. It is necessary for the converter 4 to perform an averaging process, commonly referred to as field integration, to reduce interline flicker in an interlaced scan monitor. The interlaced video signal is recorded on a magnetic tape or on an optical disk for playback through a playback device 6, such as a VTR, on a display device 8.

FIG. 11 illustrates the aperture responses of an interlaced film scan system where the image signal has been down-converted to interlaced format as described above and a hypothesized progressive film scan system where the motion picture film is progressively scanned without field integration (i.e., 2:1 vertical decimation). The graph compares aperture response against the Nyquist limit. The graph demonstrates that there is a significant loss of the vertical frequency content in the interlaced film scan system shown by the dashed line as compared to the progressive film scan system shown by the solid line.

There have been attempts to improve vertical resolution of video signals derived from motion picture film. U.S. Pat. No. 5,485,280 entitled APPARATUS AND METHOD FOR PRODUCING DOWNWARDS COMPATIBLE VIDEO SIGNALS WITH INCREASED VERTICAL RESOLUTION, AND APPARATUS FOR REPRODUCING AND DISPLAYING SAME issued on Jan. 16, 1996 and by Fujinami, and U.S. Pat. No. 5,510,902 entitled APPARATUS AND METHOD FOR PRODUCING DOWNWARDS COMPATIBLE VIDEO SIGNALS WITH INCREASED VERTICAL RESOLUTION, AND APPARATUS FOR REPRODUCING AND DISPLAYING SAME issued on Apr. 23, 1996 and by Fujinami, each disclose a method and apparatus for producing downward compatible video signals with increased vertical resolution, and apparatus for reproducing them. Each of these patents is incorporated herein by reference.

The process described in these patents includes several steps. First, the film is scanned though a high definition telecine apparatus to produce an interlaced high definition video signal with 1125 scanning lines and an aspect ratio of 16:9. The interlaced high definition video signal is converted to a progressive high definition video signal which is then down converted to a standard definition video signal with fewer vertical lines. Finally, the progressive standard definition video signal is converted to an interlaced standard definition video signal with increased vertical resolution. The increased vertical resolution of the resultant interlaced video signal is achieved by directly providing the odd lines of each standard definition progressive frame into an odd field memory corresponding to the interlaced video signal. Similarly, the even lines of each standard definition progressive frame are directly provided to an even field memory. As a result, the vertical resolution of the interlaced video signal is increased with respect to that of a standard NTSC video signal because there is no vertical lowpass filtering during the down conversion.

A flag signal is also provided to a recording/playback device to indicate the presence of the interlaced video signal with increased vertical 5 resolution. Therefore, a progressive scan monitor can be selected to reproduce the intended progressive images. The interlaced video signal with increased vertical resolution cannot, however, be properly displayed in an interlaced scan monitor without interline flicker or significant aliasing effect with or without vertical lowpass filtering. Hence the process proposed in U.S. Pat. No. 5,485,280 and U.S. Pat. No. 5,510,902 is not fully compatible with existing systems. Furthermore, substantial hardware modification to an existing telecine system is needed in order to generate the interlaced video image with increased vertical resolution.

Thus, it is desirable to develop an apparatus for a telecine system such as a FIT-based CCD film scanner to preserve the vertical resolution of the progressive film scan system while maintaining interlaced video signal output for backward compatibility with existing recording equipment and standard video interfaces. It is also desirable to develop an apparatus that converts between progressive video signals and interlaced video signals while preserving the vertical resolution of the progressive video signal and maintaining the same signal bandwidth of the interlaced video. so that both interlaced and progressive video signals are available for different applications. It is also desirable to provide an economic solution to the restoration of the full vertical resolution corresponding to a progressive video from a conventional interlaced video source produced by any CCD based film scanner or other similar device.

SUMMARY OF THE INVENTION

The present invention is embodied in a converter system and method for converting a progressive video signal to an interlaced video signal. The system includes a preprocessor that replaces one or several scan line data of a progressive frame with a predetermined scheme either known to or retrievable by an interlaced-to-progressive (ITP) decoder. For example, the kth scan line in a frame can be made equal to a specified data value (i.e., a constant), or to its preceding or succeeding scan line. More than one scan line of a frame may be replaced either by a set of known values or by their preceding or succeeding scan lines to increase error-propagation immunity in the process to avoid possible recording medium playback error.

The present invention is further embodied in a control signal generator that adds a control signal to the ancillary data of an interlaced video signal that indicates to an ITP decoder (1) the presence of a recoverable progressive video signal and (2) replacement scan line information for proper progressive video signal decoding.

The present invention is also embodied in a converter system and method that converts an interlaced video signal to a progressive video signal. The converter system includes a preprocessor that retrieves replacement scan line data based on a control signal embedded in the ancillary video data and a converter that converts the interlaced video signal to a progressive video signal. The converter utilizes a recursive algorithm to successively recover scan lines of a progressive video signal based on the replacement scan line information determined by the preprocessor. Also provided is a digital standard converter that produces a 30-frames-per-second interlaced video signal from a 24-frames-per-second interlaced video signal input.

BRIEF DESCRIPTION OF THE DRAWINGS

FIG. 3 is a more detailed block diagram of the down-converter shown in FIG. 1a.

DETAILED DESCRIPTION

Overview

Figure 1A:
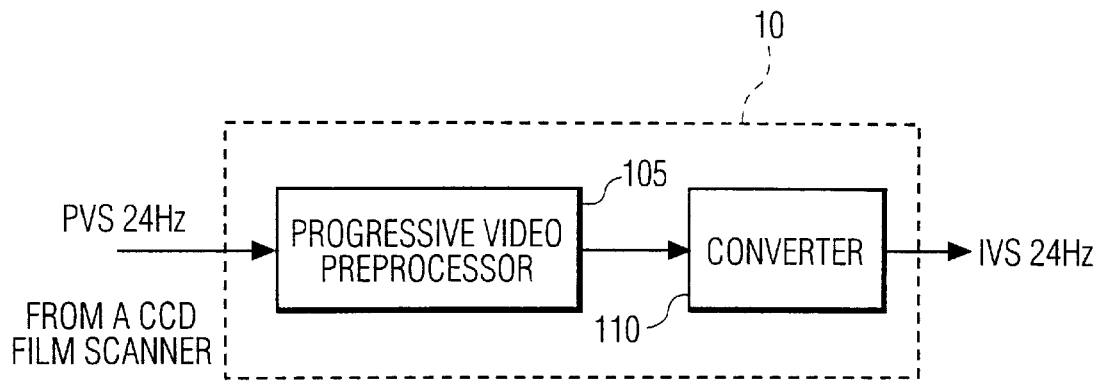
FIG. 1a is a block diagram of a progressive-to-interlaced converter according to an exemplary embodiment of the present invention.
Figure 1B:
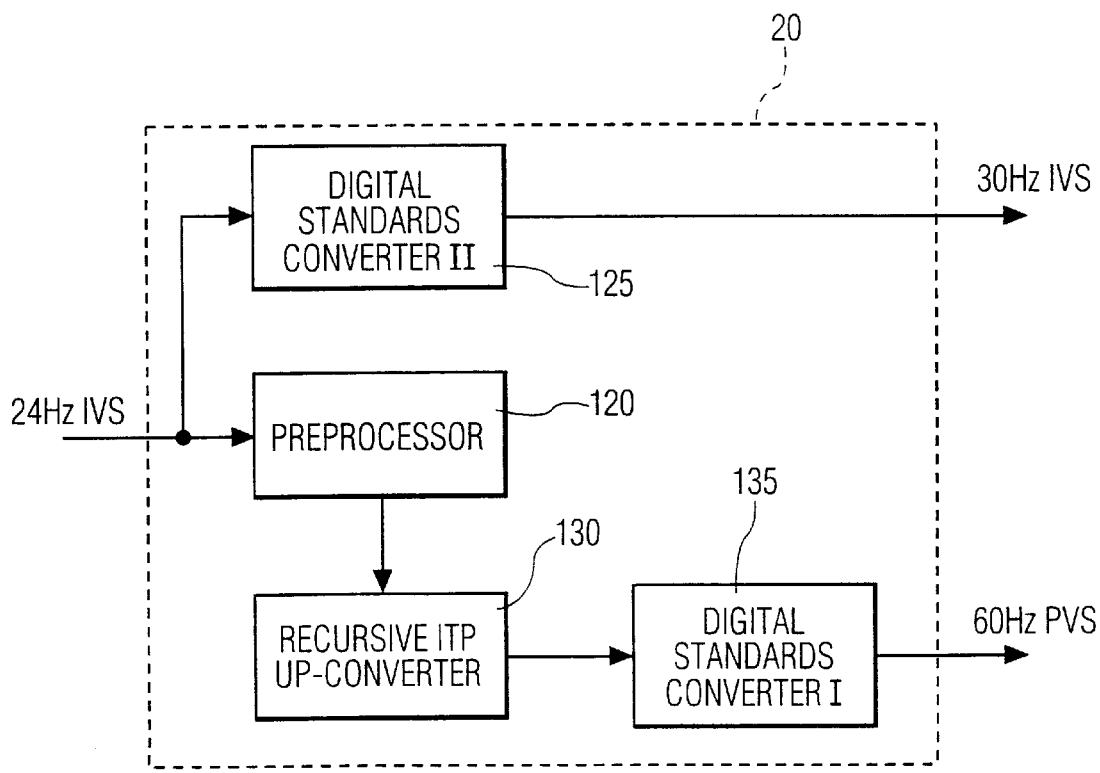
FIG. 1b is a block diagram of an interlaced-to-progressive converter according to another exemplary embodiment of the present invention.

FIGS. 1a and 1b illustrate respectively a progressive-to-interlaced (PTI) converter 10 and an interlaced-to-progressive (ITP) converter 20. The PTI converter 10 may be used in a CCD based telecine system and the ITP converter 20 may be used in any electronic device where both interlaced and progressive video formats are desirable.

The PTI converter 10 includes progressive video preprocessor 105 that preprocesses the progressive video signal generated from a CCD camera either by making two or more than two consecutive scan lines identical or by making one or several scan line(s) constant. Next, the converter 110 converts the progressive video signal to an interlaced video signal using field integration or vertical 2:1 decimation. In either case, the information regarding how the film is scanned/converted, e.g. the location of the repeating scan lines or of the scan line with a constant value and the field integration or decimation parameters, can be embedded in the ancillary data of any suitable digital video data stream.

The ITP converter 20 (1) converts the 24-frame-per-second IVS produced by the PTI converter 10 to a 24-frame-per-second progressive video signal that is converted to a 60-frame-per-second progressive video signal using 3:2 pull down and/or (2) converts the 24-frame-per-second IVS to a 30-frame-per-second IVS using digital standards conversion. The ITP converter 20 includes a preprocessor 120 that retrieves the embedded data in the ancillary data of the interlaced video signal in order to perform the decoding operation. The data embedded in the ancillary data includes the location of the two or more than two identical scan lines or the location of the scan lines with a predetermined (constant) value. The embedded data may also include the field integration or decimation parameters.

Once the ITP converter 20 identifies the embedded data, recursive ITP up-converter 130 converts the interlaced video signal using a forward and/or backward recursive algorithm which successively determines the original progressive scan lines in a top-down and/or bottom-up manner. The digital standards converter I 135 converts the 24-frame-per-second progressive video signal from the up-converter 130 to a 60-frame-per-second PVS.

To generate a 30-frame-per-second (NTSC) IVS, the digital standards converter 125 repeats every 5th field from the 24 Hz IVS. Because of its dual capability, the ITP converter 20 preserves the vertical resolution of a progressive film scan system and maintains (NTSC) interlaced video signal output for backward compatibility with existing recording equipment and standard video interfaces in the broadcasting and consumer electronics industry. Further, there is no increase in signal bandwidth to double the vertical resolution of an interlaced video signal. In addition, the proposed PTI converter 10 and ITP converter 20 provide an economic process to restore the full vertical resolution corresponding to a progressive video signal from an interlaced video source. The PTI converter 10 and the ITP converter 20 can be an add-on unit to an existing telecine system and a digital VTR, respectively, where both progressive or interlaced video formats are desirable.

DESCRIPTION OF EXEMPLARY EMBODIMENTS

Figure 2A:
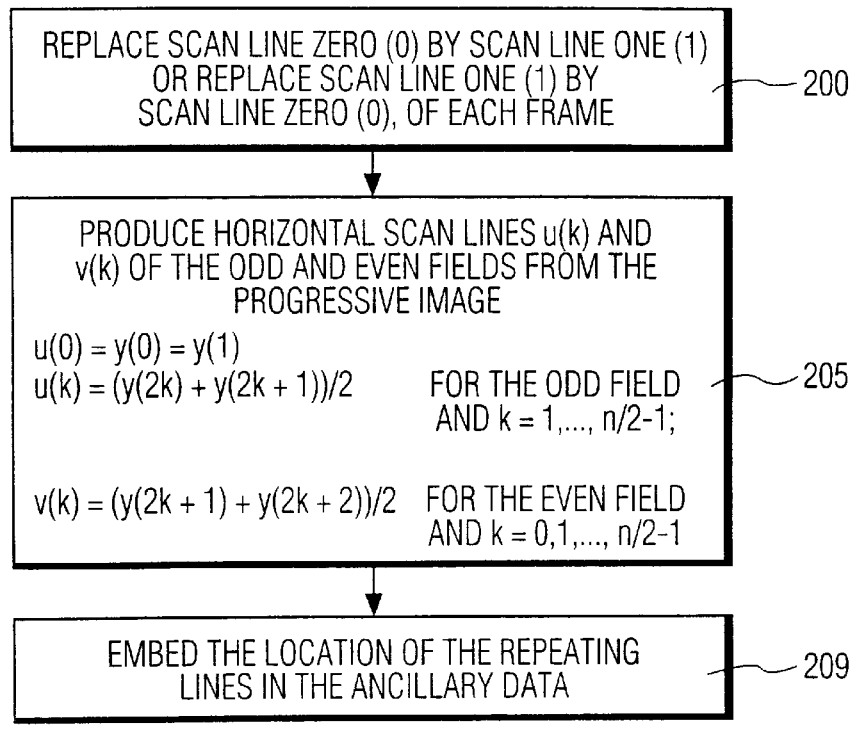
FIG. 2a is a flow chart diagram useful for explaining the operation of the progressive-to-interlaced converter according to a first exemplary embodiment of the present invention.

The operation of the PTI converter 10 is described below with reference to FIGS. 2a, 3, and 4. The PTI converter 10 (shown in FIG. 1a) is provided a progressive video signal PVS that comprises frames each of which includes n horizontal scan lines y(k) where k=0, 1, ..., n−1. An exemplary frame 32 is shown in FIG. 4. As is shown in FIG. 2a, at step 200, the PTI converter replaces scan line y(0) by scan line y(1) or scan line y(1) by scan line y(0) for each frame 32.

As is described below, the progressive video signal PVS may be recovered assuming that, for example, the first horizontal scan line y(0) or the second horizontal scan line y(1), is known. By repeating the first horizontal scan line y(0) or the second horizontal scan line y(1), one of the horizontal scan lines u(0) of the field 34 in the interlaced video signal IVS is the same as the first horizontal scan line y(0) or the second horizontal scan line y(1), of the progressive video signal PVS. In other words, an interlaced to progressive converter can use the horizontal scan line u(0) to recover the progressive video signal while preserving the vertical resolution of the original progressive video signal. The interlaced video signal IVS includes fields 34 and 36 which have respective horizontal scan lines u(m) and v(m) where m=0, 1, ..., n/2.

At step 205, the progressive video signal PVS is converted to the interlaced video signal IVS. If there is no additional processing of the interlaced video signal IVS, the interlaced video signal IVS including fields 34 and 36 (shown in FIG. 4) may be converted to the progressive video signal PVS assuming that, for example, y(0) is known. The PTI converter 10 combines the even horizontal scan lines y(0), y(2), y(4) .... y(K−1) and the odd horizontal scan lines y(1), y(3), y(5), ... y(K) of each frame (shown in FIG. 3b) according to equations (1) and (2) below to produce odd fields and even fields.

$$u(k)=(y(2k)+y(2k+1))/2 \qquad (1)$$

for the odd field and k=0,1, ..., n/2−1;

$$v(k)=(y(2k+1)+y(2k+2))/2 \qquad (2)$$

for the even field and k=0,1, ..., n/2−1

In equations (1) and (2), y(k) is a horizontal scan line in a frame of the progressive video signal PVS produced by, for example, the telecine apparatus before converting to an interlaced video signal IVS and u(k) and v(k) are the respective horizontal scan lines for each field 34 and 36 of the interlaced video signal IVS.

Returning to FIG. 1a, the progressive video signal PVS is provided to the progressive video preprocessor 105. The preprocessor 105 selects the first horizontal scan line y(0) or the second horizontal scan line y(1) of the frame 32 in the progressive video signal PVS and replaces the second horizontal scan line y(1) with the first horizontal scan line y(0) or vice versa, to produce a modified progressive video signal. The modified progressive video signal is provided to converter 110 which implements a field transfer operation or a 2:1 decimation operation to produce the interlaced video signal IVS. A more detailed block diagram of the converter 110 implementing equations (1) and (2) above for the field transfer operation is shown in FIG. 3.

Figure 3:
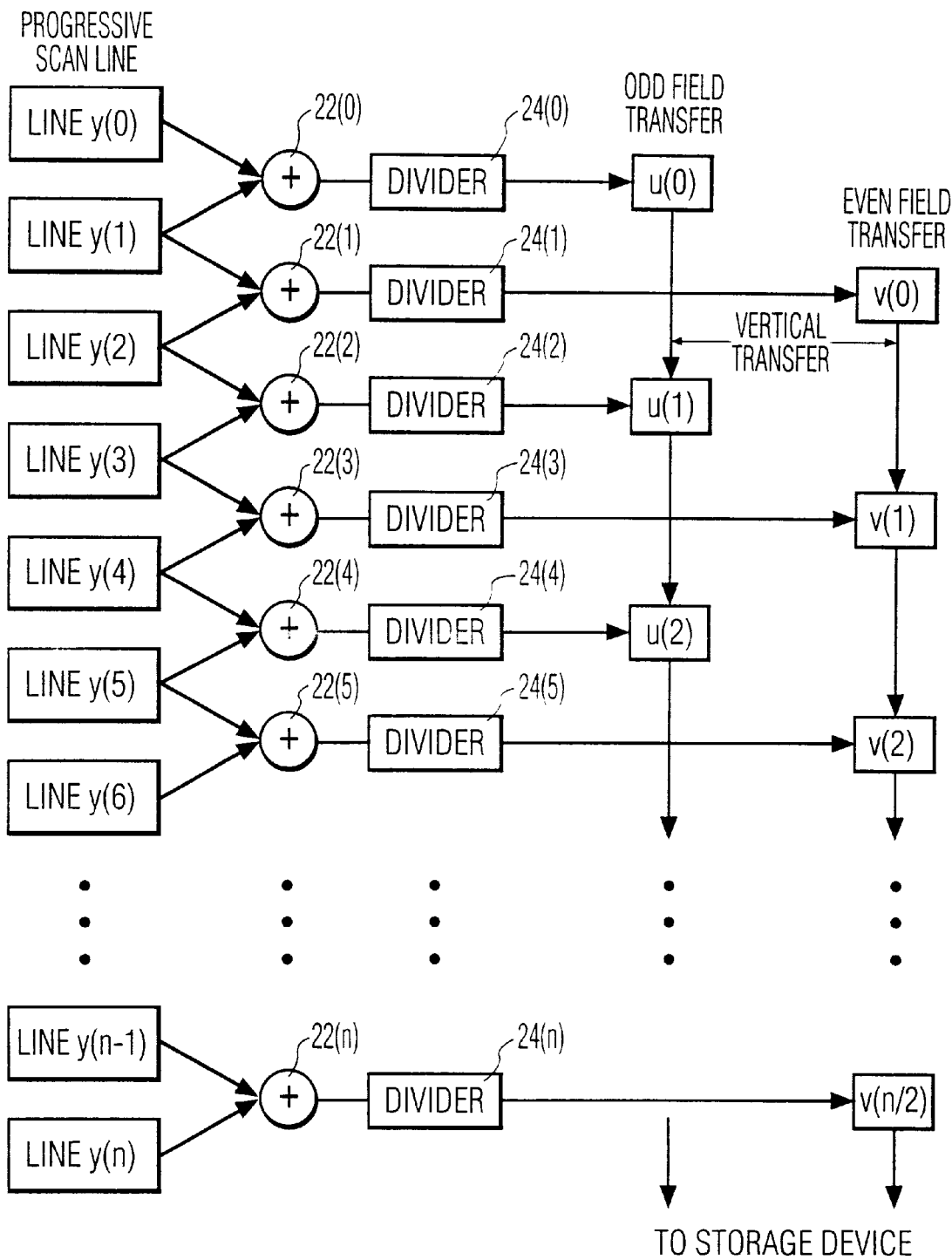
Figure 4:
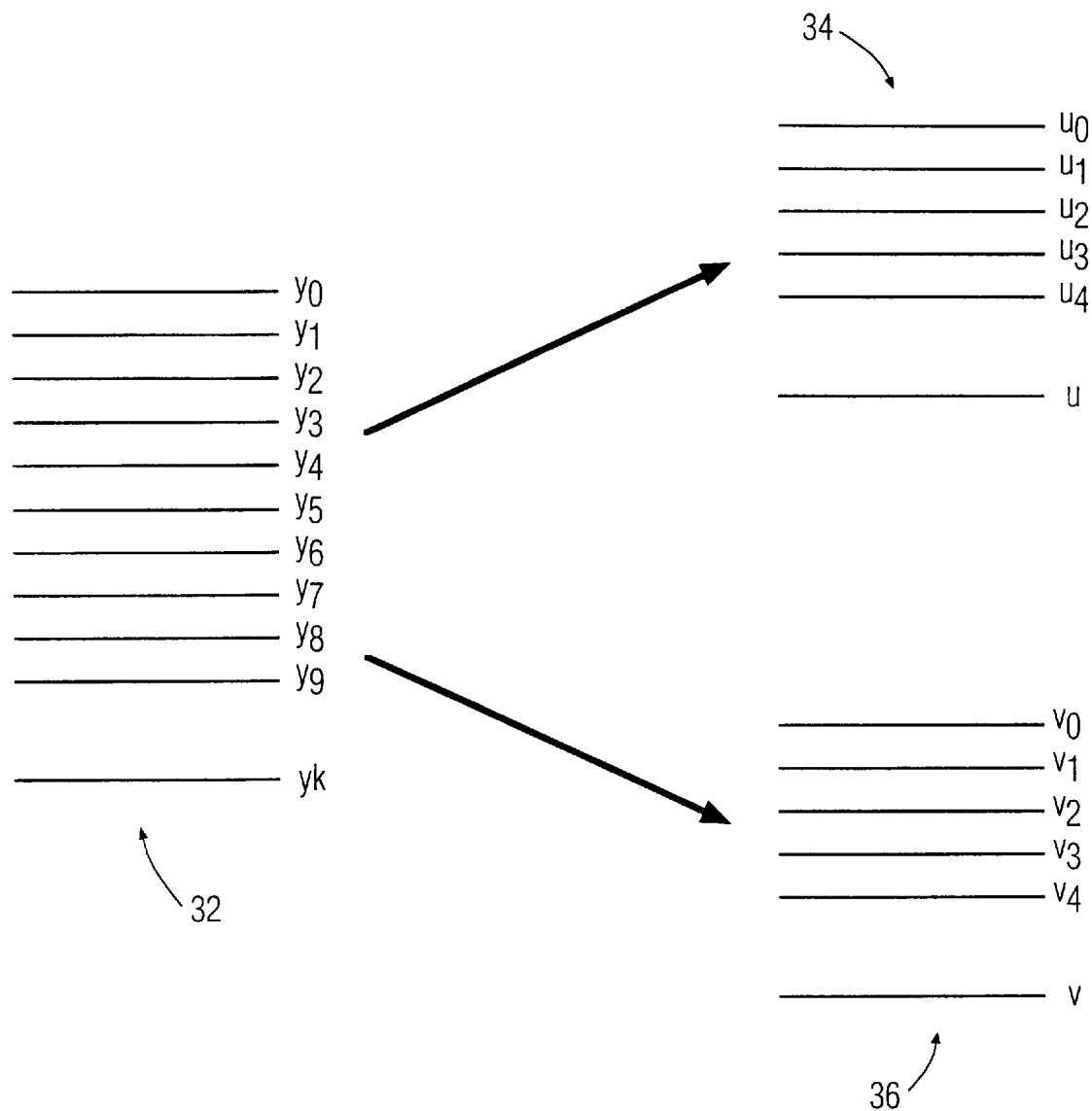
FIG. 4 is a diagram useful for illustrating the conversion of frames to fields.

The circuitry shown in FIG. 3 may be implemented, for example, in any FIT CCD film scanner. In FIG. 3, scan lines y(0) through y(n) are provided to respective adders 22(0) through 22(n) which provide the added signals to respective dividers 24(0) through 24(n) to produce horizontal scan lines u(0) through u(n/2) and v(0) through v(n/2). For example, horizontal scan lines y(2) and y(3) are provided to the adder 22(2). After horizontal scan lines y(2) and y(3) are added, the added scan lines are divided by two (2) using the divider 24(2) to produce horizontal scan line u(1) in the odd field 34 shown in FIG. 3. The same process above is performed to produce horizontal scan line u(0) except horizontal scan line y'(1) has been replaced with horizontal scan line y(0) prior to addition by the adder 22(0). As a result, horizontal scan line u(0) is equivalent to horizontal scan line y(0) as is demonstrated below.

In the embodiment shown in FIG. 2a, horizontal scan line y(0) is equivalent to horizontal scan line u(0). This is demonstrated in equation (3) below where the horizontal scan line u(0) is calculated using equation (1) above where k is zero.

$$u(0)=(y(0)+y(1))/2 \qquad (3)$$

Because horizontal scan line y(0) has been repeated as horizontal scan line y(1), equation (3) may be rewritten as equation (4) below.

$$u(0)=(y(0)+y(0))/2=y(0) \qquad (4)$$

Where y are the horizontal scan lines of the progressive video signals PVS and u and v are the horizontal scan lines of the respective fields of the interlaced video signal IVS.

Returning to FIG. 2a, data specifying which scan line has been replaced may be embedded in the ancillary data that is transmitted with the signal IVS. In this case, at step 209, the location of the repeating lines is embedded in ancillary data which is transmitted with the interlaced video signal IVS. In addition, the field integration or decimation parameters used by the converter 110 can be embedded in the ancillary data of any suitable digital video data stream. As is described below, the field integration or decimation parameters are retrieved from the ancillary data and used by the recursive ITP up-converter 130 for converting the interlaced video signal IVS to a progressive video signal.

Figure 2B:
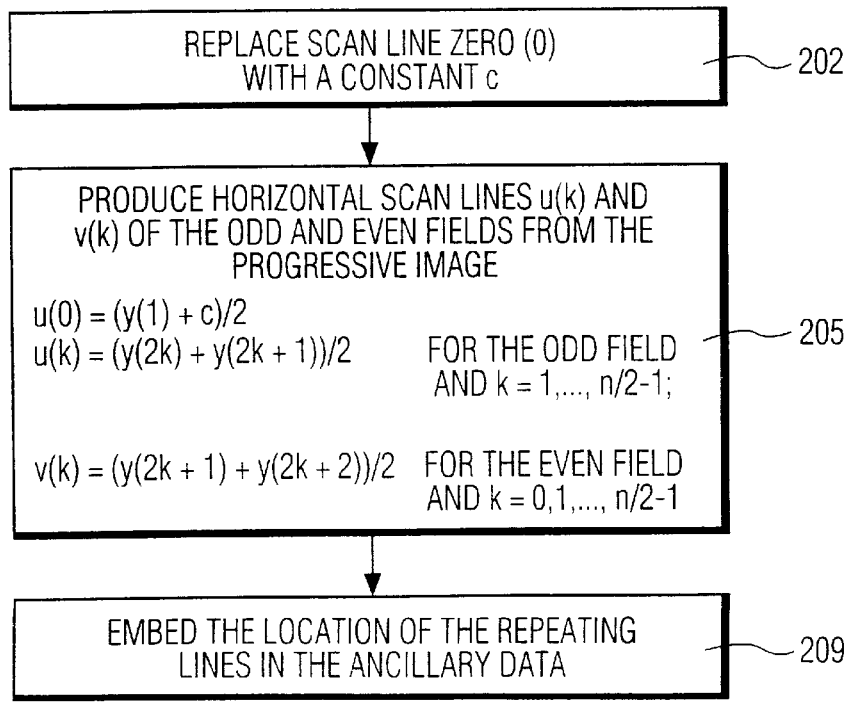
FIG. 2b is a flow chart diagram useful for explaining the operation of the progressive-to-interlaced converter according to a second exemplary embodiment of the present invention.

FIG. 2b illustrates the operation of an alternative exemplary embodiment of the PTI converter 10. At step 202, the first horizontal scan line y(0) of the progressive video signal PVS is replaced with a constant value C by preprocessor 105 shown in FIG. 1a. The progressive video signal PVS can be recovered assuming that the first horizontal scan line y(0) is known. By replacing the first horizontal scan line y(0) with a constant value C, the constant value can be stored in or provided to the ITP converter 20. As a result, the progressive video signal PVS can be recovered from the interlaced video signal IVS while preserving the vertical resolution of the progressive video signal. Next, at step 205, the interlaced video signal IVS is produced from the progressive video signals PVS as described above. At step 209, when the constant value is provided to the IW converter 20, the constant value C is embedded in ancillary data which is transmitted with the interlaced video signal IVS.

Figure 2C:
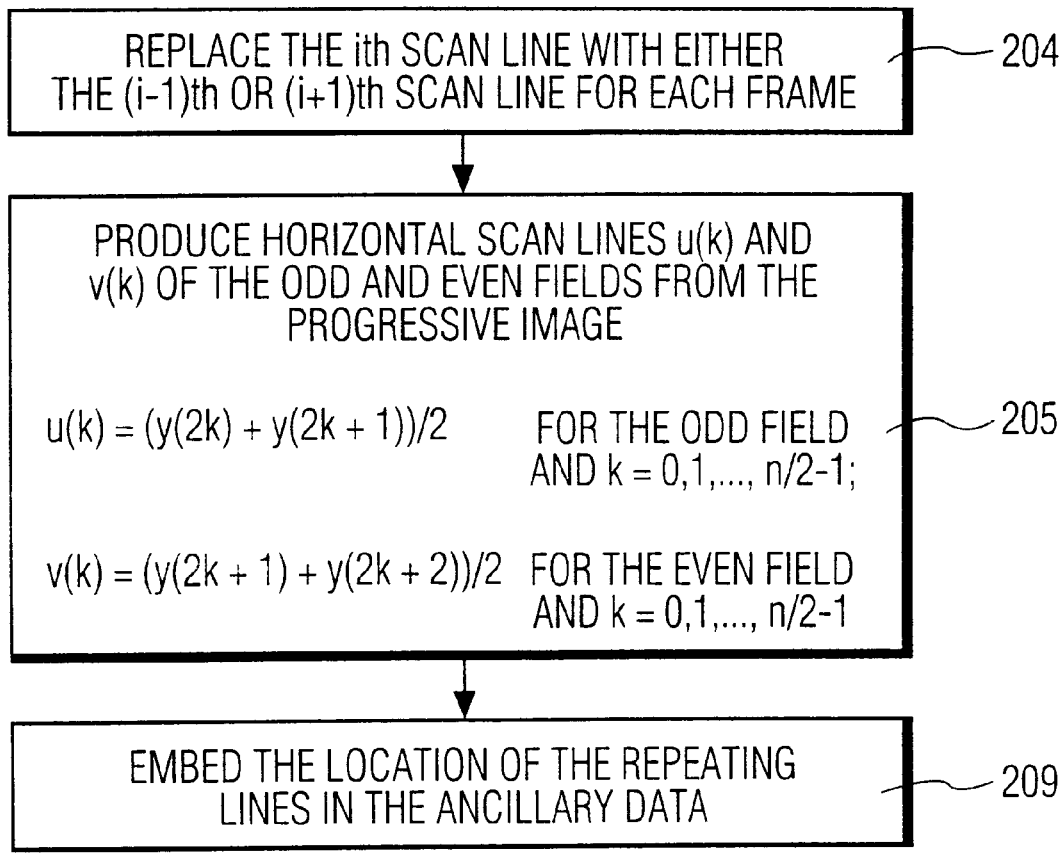
FIG. 2c is a flow chart diagram useful for explaining the operation of the progressive-to-interlaced converter according to a third exemplary embodiment of the present invention.

FIG. 2c illustrates the operation of another alternative exemplary embodiment of the PTI converter 10. At step 204, the horizontal scan line y(i) of the progressive video signal PVS is replaced with (1) a constant value or (2) a previous horizontal scan line y(i−1) or a subsequent horizontal scan line y(i+1) where $1 \leq i \leq n/2$. In this case, y(i) may be the first, second, or other than the first or second horizontal scan lines. The constant value, previous horizontal scan line y(i−1), or subsequent horizontal scan line y(i+1) is provided to combiner 300 from generator 310. In this case, at step 209, the location of the repeating lines is embedded in ancillary data which is transmitted with the interlaced video signal IVS. The progressive video signal PVS can be recovered because one of the horizontal scan lines is known. As a result, the progressive video signal PVS can be recovered from the interlaced video signal IVS while preserving the vertical resolution of the progressive video signal. Next, at step 205, the interlaced video signal IVS is produced from the progressive video signals PVS as described above. In addition, more than one of the horizontal scan lines of the progressive video signal PVS may be replaced. In this case, the location of each of the repeating lines is embedded in ancillary data which is transmitted with the interlaced video signal IVS. By replacing more than one scan line, the error-propagation immunity is increased avoiding possible recording medium playback errors. These errors could affect the conversion of the interlaced video signal IVS to the progressive video signal PVS by ITP converter 20.

Figure 5:
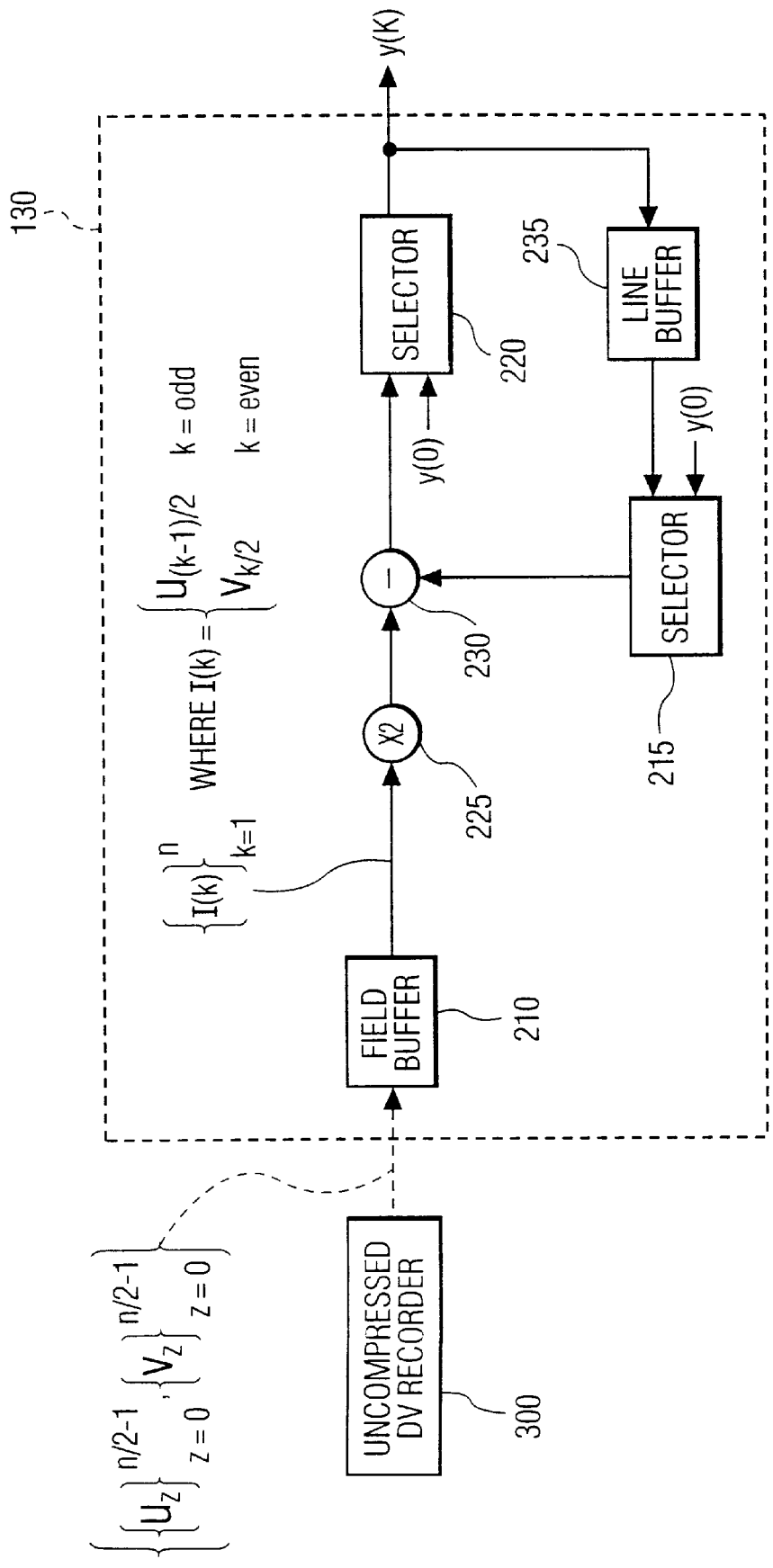
FIG. 5 is a block diagram of an interlaced-to-progressive converter according to another exemplary embodiment of the present invention.

An exemplary ITP converter 20 for producing the progressive video signal PVS from the interlaced video signal IVS is shown in FIG. 1b and operates as described above. FIG. 5 is a detailed block diagram of the recursive ITP up-converter 130 shown in FIG. 1b. The converter 130 implements equations (5) and (6) below and is provided with the interlaced video signal IVS from uncompressed DV recorder 300 via preprocessor 120 (not shown in FIG. 5). Assuming the first horizontal scan line y(0) is known, each scan line y(k) may be produced using a forward recursive operation set forth in equations (5) and (6) below.

$$y(2j+1)=2u(j)-y(2j) \text{ (odd scan lines) } j=0, 1, \ldots, n/2-1 \quad (5)$$

$$y(2j+1)=2v(j)-y(2j+1) \text{ (even scan lines)} j=0, 1, \ldots, n/2-1 \quad (6)$$

The horizontal scan lines u(z) and v(z) of the odd and even fields 34 and 36 of the interlaced video signal IVS, shown in FIG. 4, are stored in the field buffer 210. The horizontal scan lines u(z) and v(z) are converted to horizontal scan lines y(k) of a progressive video signal using multiplier 225, subtractor 230, line buffer 235, and selectors 215 and 220 as described below with reference to FIG. 6.

In a more general case, where horizontal scan line y(2J) is known to the ITP converter 20, the progressive video signal can be recovered while preserving vertical resolution using forward and backward recursive equations (7), (8), (9) and (10) below where $0 \leq J \leq n/2$. In other words, horizontal scan lines y(k) above can be recovered. Thus, when y(0) is known, progressive video signal PVS may be recovered using forwarded recursive equations (3) and (4).

Figure 6:
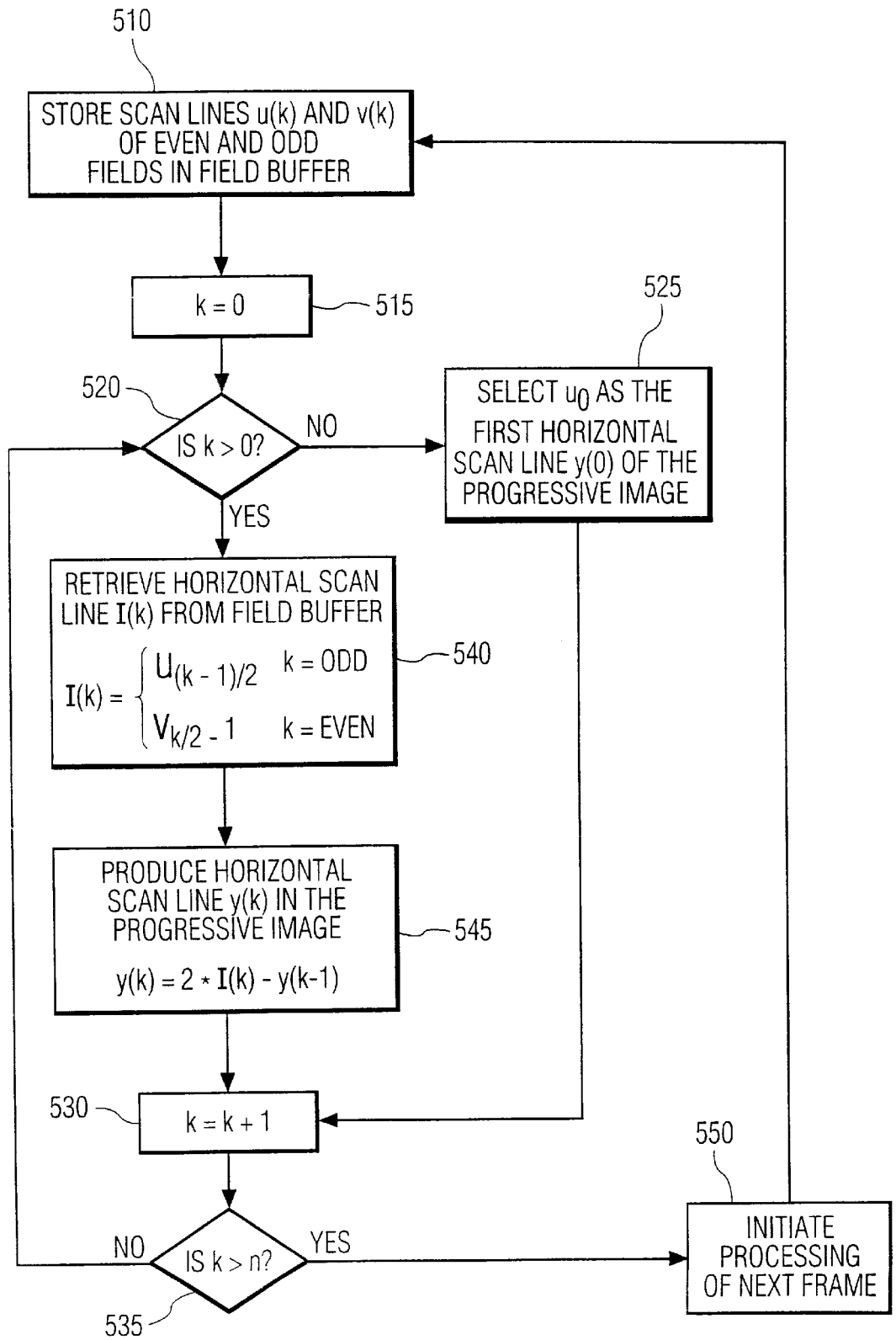
FIG. 6 is a flow chart diagram useful for explaining the operation of the interlaced-to-progressive converter shown in FIG. 5.

At step 510, shown in FIG. 6, the horizontal scan lines u(z) and v(z) are stored in field buffer 210 because horizontal scan lines u(z) and v(z) from each of the fields are used to produce the horizontal scan lines y(k) in the progressive video signal PVS. The field buffer 210 stores one or more fields. At step 515, k is set equal to zero (0) where k is an integer. For example, the field buffer 210 stores the first field containing horizontal scan lines v(z) and the second field containing horizontal scan lines u(z). Thus, the horizontal scan lines u(z) and v(z) can be provided alternatively from the field buffer 20.

At step 520, it is determined if k is greater than zero. At step 525, when k is zero, the first horizontal scan line u(0) is provided from the field buffer 210 and selected by selector 220 as the first horizontal scan line y(0) of the frame of the progressive video signal PVS. Alternatively, y(0) may be a fixed value that has been stored in a memory (not shown) in the ITP converter 20. In this case, the fixed value is retrieved from memory when the conversion is initiated. Alternatively, the fixed value may be provided in the ancillary data of the interlaced video signal. In this case, the preprocessor 120, shown in FIG. 1b, retrieves data corresponding to the constant value from the interlaced video signal IVS. This data is provided to selector 220.

Figure 9:
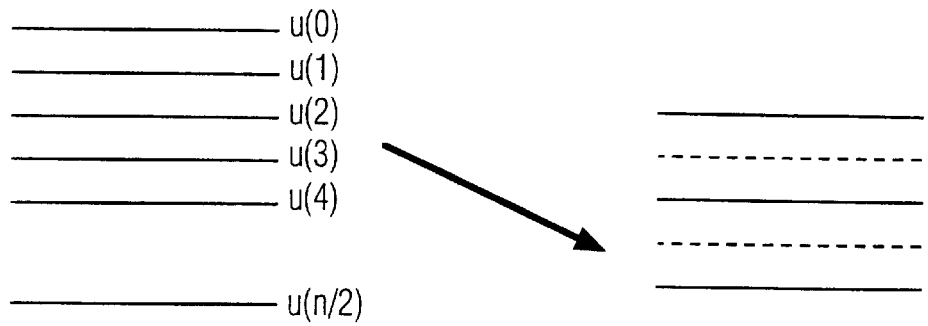
FIG. 9 is diagram useful for illustrating fields and a frame of an interlaced video signal.
Figure 9:
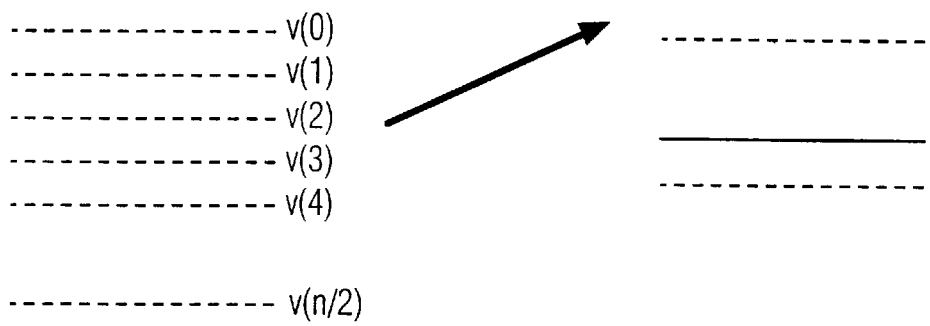
Figure 10:
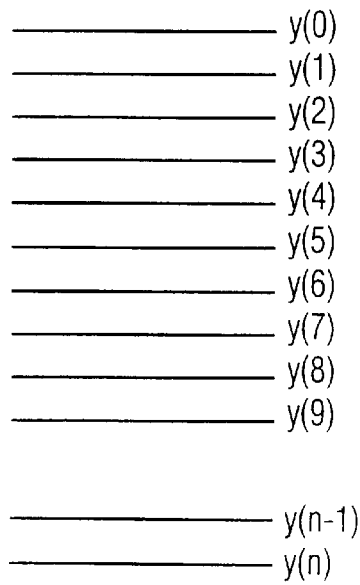
FIG. 10 is a diagram useful for illustrating a frame of a progressive video signal.
Figure 11:
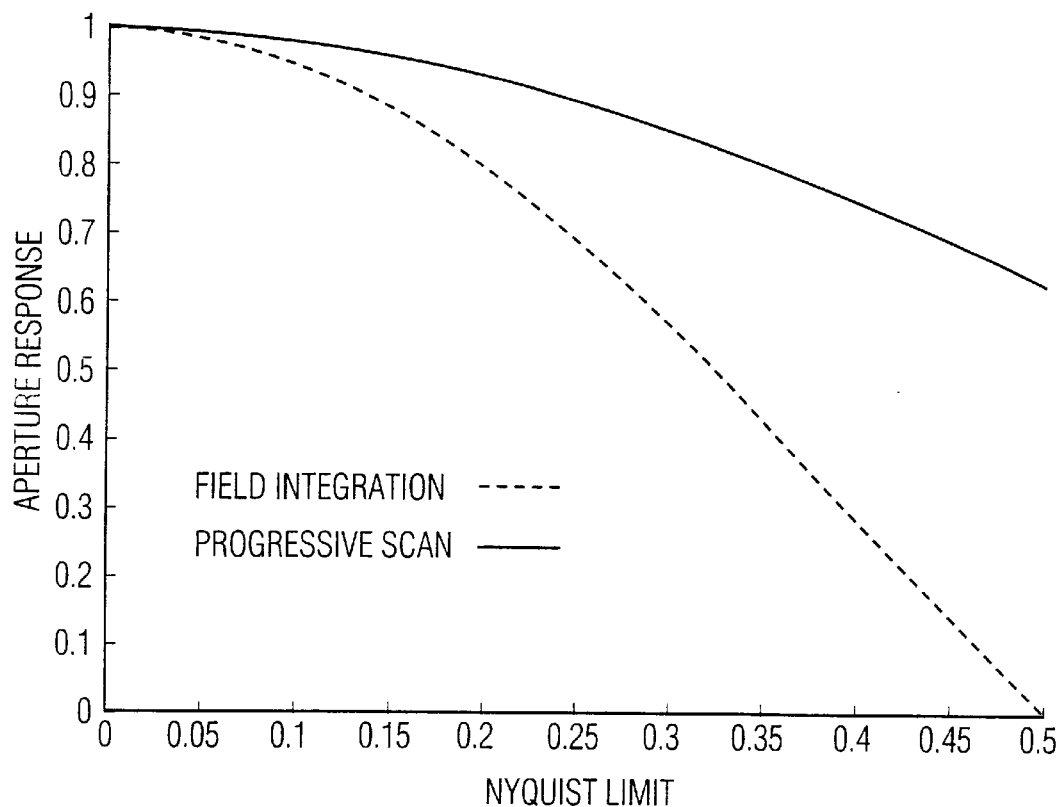
FIG. 11 is a chart illustrating the aperture response of interlaced and progressive systems using a 2-tap filter with the transfer function $H(f)=1-\exp(-2\pi f)$).
Figure 12:
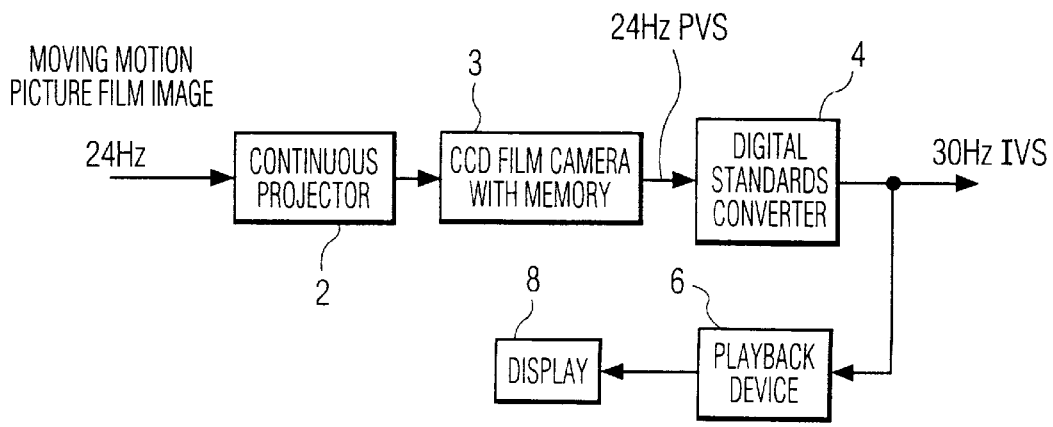
FIG. 12 is a block diagram of a prior art telecine system.

Next, at step 530, k is incremented by one (1). At step 535, it is determined whether k is greater than n where n is the number of horizontal scan lines in a frame of the progressive video signal PVS. If k is less than n step 520 is repeated. If it is determined at step 520 that k is greater than zero (0) (i.e. 1), then the next horizontal scan line v(0) from field 36, shown in FIG. 9, is provided from the field buffer 210. The horizontal scan lines u(z) and v(z) from the fields 4 and 6 are alternately retrieved from the field buffer 210. At step 545, the retrieved horizontal scan line u(z) or v(z) is multiplied by two using multiplier 225, and the previous horizontal scan line y(k−1) is subtracted from the multiplied signals to produce the horizontal scan line y(k). Then steps 530 and 535 are repeated. At step 550, once the horizontal scan lines for an entire frame 32 have been produced, when k is greater than n, processing of the next frame is initiated and step 510 is repeated.

As a result, the PTI converter 10 and the ITP converter 20 provide the restoration of the full vertical resolution corresponding to a progressive video signal from a conventional interlaced video source produced by any progressive film scanner or other similar device where at least one of the horizontal scan lines have been repeated or replaced with a constant value.

Alternatively, the ITP converter 20 may implement the more general case where one horizontal scan line y(2J) of the progressive video signal is known and $0 \leq J \leq n/2$. $\{y(k)\}_{k=0, k \neq 2J}^{n}$ can be recovered using forward and backward recursive equations. In this case, the known horizontal scan line can be other than the first horizontal scan line. The horizontal scan line y(2J) is identified by embedding data in the ancillary data as described above. The preprocessor 120 retrieves the embedded data and provides it to the up-converter 130. Forward recursive equations (7) and (8) and backward recursive equations (9) and (10) below are used to recover the progressive video signal. The forward recursive equations (7) and (8) are used to produce horizontal scan lines from y(J+1) to y(n−1) and the backward recursive equations (9) and (10) are used to produce horizontal scan lines y(J−1) to y(0).

Forward Estimation $$y(2j+1)=2u(j)-y(2j) \text{ let } j=J, J+1, \ldots, n/2-1 \quad (7)$$

$$y(2(j+1))=2(v(j)-u(j))+y(2j) \text{ let } j=J, J+1, \ldots, n/2-1 \quad (8)$$

Backward Estimation $$y(2j-1)=2v(j-1)-y(2j) \text{ let } j=J, J-1, \ldots, 1 \quad (9)$$

$$y(2(j-1))=2(u(j-1)-v(j-1))+y(2j) \text{ let } j=J, J-1, \ldots 1 \quad (10)$$

In the above equations, $1 \leq J \leq n/2$ and K is the not equal to 2J. The closed-form expressions of equations (7) and (8) are set forth in equations (11), (12), and (13) below and the closed-form expression of equations (9) and (10) are set forth in equations (14), (15), and (16) below.

Forward estimation $$y(2J+1) = 2u(J) - y(2J) \quad (11)$$

$$y(2(J+m)) = 2\sum_{p=0}^{m-1}(v(J+p) - u(J+p)) + y(2J), m = 1, 2, \ldots, \frac{n}{2} - J \quad (12)$$

$$y(2(J+m)+1) = 2u(J+m) - 2\sum_{p=0}^{m-1}(v(J+p) - u(J-p)) - y(2J), \quad (13)$$

$$m = 1, 2, \ldots, \frac{n}{2} - J - 1$$

Backward estimation $$y(2J-1) = 2v(J-1) - y(2J) \quad (14)$$

$$y(2(J+m)) = 2\sum_{p=0}^{m-1}(u(J-p-1)) - (v(J-p-1)) + y(2J), \quad (15)$$

$$m = 1, 2, \ldots, J$$

$$y(2(J-m)-1) = \quad (16)$$

$$2v(J-m-1) - 2\sum_{p=0}^{m-1}(u(J-p-1)) - v(J-p-1)) - y(2J),$$

$$m = 1, 2, \ldots, (J-1)$$

Figure 7:
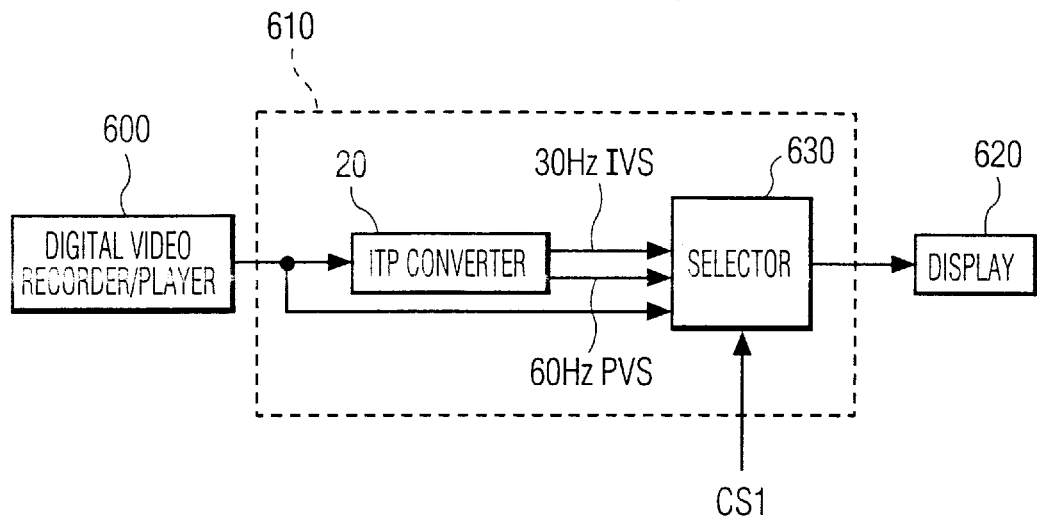
FIG. 7 is a block diagram of a system including an interlaced-to-progressive converter for displaying images according to an exemplary embodiment of the present invention.

FIG. 7 illustrates an alternative embodiment of the present invention where a selective ITP converter 610 is coupled to a digital video (DV) recorder/player 600. Also coupled to the ITP converter 610 is a display 620 that displays progressive scanned images. Alternatively, display 620 may display interlaced images. The DV recorder/player is, for example, a Panasonic uncompressed D-5 recorder. Although selective ITP converter 610 is shown separate from the DV recorder/player 600 and the display 620, the selective ITP converter 610 may be incorporated into the DV recorder/player 600 and/or the display 620.

Selective ITP converter 610 includes ITP converter 20 shown in FIG. 1b and a selector 630 for providing the interlaced video signal IVS from the DV recorder directly to display 630 or the progressive video signal PVS from ITP converter 20 to the display 620 in response to a control signal CS1. The control signal CS1 indicates whether the display 620 is for displaying interlaced or progressive video signals.

In addition, the selector 630 determines whether the full vertical resolution of the progressive video signal PVS can be recovered from the interlaced video signal IVS. In this case, at the time of conversion from progressive to interlaced format, data is included in the interlaced video signal IVS indicating whether the progressive video signal PVS has been encoded with a repeated horizontal scan line or a horizontal scan line that has a constant value. This data may be provided as digitally encoded data transmitted in the vertical blanking period as described in U.S. Pat. No. 5,309,235 entitled SYSTEM AND METHOD FOR TRANSMITTING DIGITAL DATA IN THE OVERSCAN PORTION OF A VIDEO SIGNAL by S. Naimpally, issued on May 3, 1994, which is hereby incorporated by reference for its teachings on sending auxiliary data in a television signal. Alternatively, this data may be provided as digitally encoded data transmitted using Fukinuki-type modulation as described in U.S. Pat. No. 5,430,487 entitled METHOD AND APPARATUS FOR IMPROVING TEMPORAL VIDEO SIGNAL PROCESSING USING MOTION VECTORS TRANSMITTED WITH THE VIDEO SIGNAL by S. Naimpally, issued on Jul. 4, 1995, which is hereby incorporated by reference for its teachings on sending auxiliary data in a television signal.

The selector 630 detects the data and selects the signal provided from ITP converter 20. This assumes that the display 620 can display a progressive video signal PVS. The frame rate of the recovered progressive video signal PVS is 60 Hz. As a result, the embedded high vertical resolution information can be retrieved from the interlaced video signal. In this manner, both interlaced and progressive digital video signals are available and can be routed to appropriate video systems for display.

Figure 8:
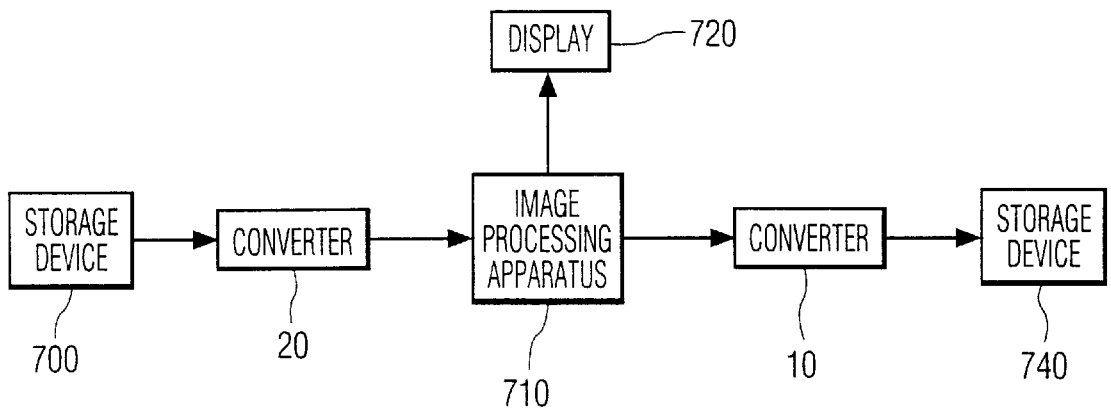
FIG. 8 is a block diagram of an editing system including an interlaced-to-progressive converter and a progressive-to-interlaced converter.

FIG. 8 illustrates an alternative embodiment of the present invention where ITP converter 20 is coupled to a storage device 700. Also coupled to the ITP converter 20 is an image processing apparatus 710 for editing the progressive video signal PVS and the interlaced video signal IVS. The image (s) to be processed is converted to progressive format because many digital video processing operations such as standards format conversion and frame rate conversion can be more easily performed using a progressive format video signal. The image being processed by image processing apparatus 710 is displayed on display 720. Once the images have been processed, the progressive video signal PVS is provided to PTI converter 10 which produces the interlaced video signal IVS for storage in storage device 740.

Figure 13:
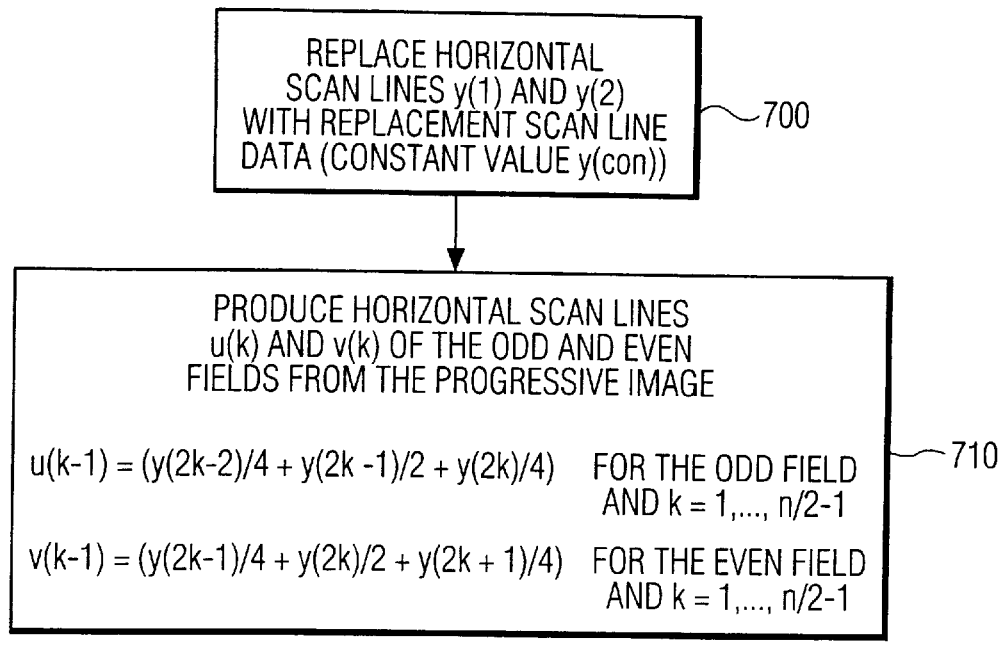
FIG. 13 is a flow chart diagram useful for explaining the operation of a progressive-to-interlaced converter according to another exemplary embodiment of the present invention.
Figure 14:
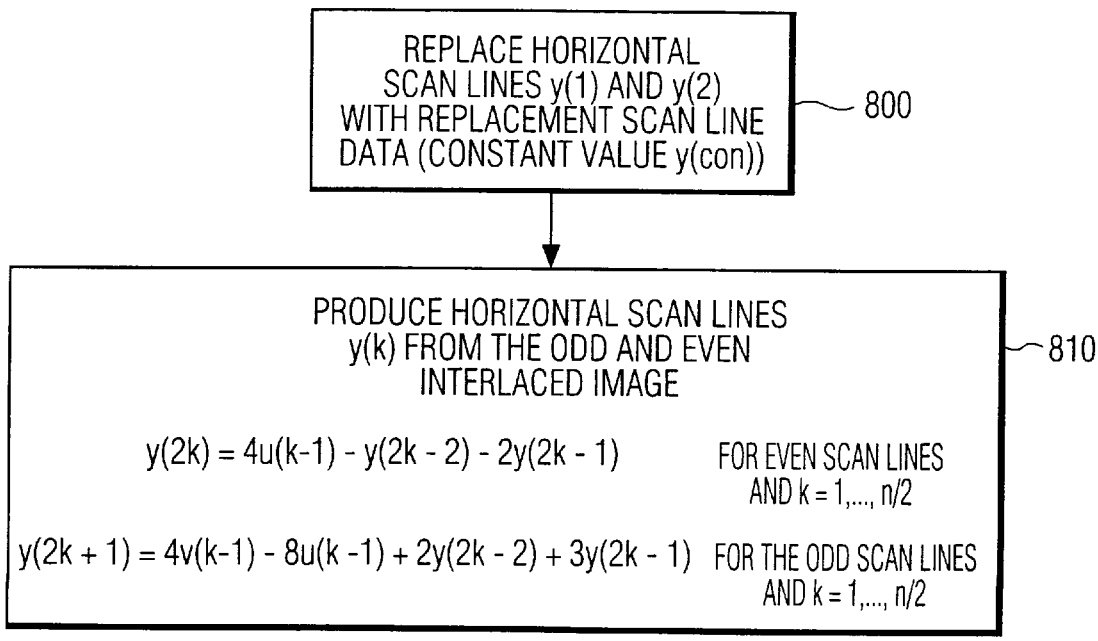
FIG. 14 is a flow chart diagram useful for explaining the operation of an interlaced-to-progressive converter according to another exemplary embodiment of the present invention.

FIGS. 13 and 14 illustrate the operation of another exemplary embodiment of the PTI converter and ITP converter, respectively. In this embodiment a 3-tap Finite Impulse Response (FIR) filter (not shown) is used during the conversion between interlaced video signals and progressive video signals. The tap coefficients for the 3-tap FIR filter are, for example, [¼, ½, ¼]. The operation of the PTI converter is described below with reference to FIG. 13. The PTI converter 10 is provided a progressive video signal PVS that is composed of frames each of which includes n horizontal scan lines y(k) where k=0, 1, . . . , n−1. At step 700, the preprocessor 105 replaces the first horizontal scan line y(0) and the second horizontal scan line y(1) of the frame with a constant value y(con).

At step 710, the converter 110 produces the interlaced video signal IVS from the progressive video signals PVS using equations (17) and (18) below. The constant value and the coefficient values for converting the progressive video signal PVS may be embedded in the ancillary data that is provided with the interlaced video signal IVS. If there is no additional processing of the interlaced video signal IVS, the interlaced video signal IVS including fields 34 and 36, shown in FIG. 4, can be converted to the progressive video signal PVS assuming that, for example, the constant value y(con) is known to the ITP converter. The PTI converter 10 combines the even horizontal scan lines y(0), y(2), y(4), . . . y(k−1) and the odd horizontal scan lines y(1), y(3), y(5), . . . y(k) of each frame according to equations (17) and (18) below to produce odd fields and even fields.

$$u(k-1)=(y(2k-2)/4+y(2k-1)/2+y(2k)/4) \quad (17)$$

for the odd field and k=1, . . . , n/2−1

$$v(k-1)=(y(2k-1)/4+y(2k)/2+y(2k+1)/4) \quad (18)$$

for the even field and k=, . . . , n/2−1

In equations (17) and (18), y(k) are the horizontal scan lines that represent the progressive images before converting to an interlaced video signal IVS and u(k) and v(k) are the respective horizontal scan lines for each field 34 and 36 (shown in FIG. 4) of the interlaced video signal IVS, and k=0, . . . , n.

The progressive scan lines y(k) can be recovered by an ITP converter 20 implementing equations (19) and (20) below.

$$y(2k)=4u(k-1)-y(2k-2)-2y(2k-1) \quad (19)$$

for even scan lines and k=1, . . . , n/2

$$y(2k+1)=4v(k-1)-8u(k-1)+2y(2k-2)+3y(2k-1) \quad (20)$$

for odd scan and k=1, . . . , n/2

The operation of the ITP converter 20 is described below with reference to FIG. 14. At step 800, the constant value y(con) is retrieved from, the ancillary data provided with the interlaced video signal IVS. In addition, the coefficient values used by converter 110 may also be retrieved and used by recursive ITP up-converter 130, shown in FIG. 1b. Next, at step 810, converter 130 implements equations (19) and (20) to produce the horizontal scan lines y(k) by substituting the constant value y(con) for horizontal scan lines y(1) and y(2) and using the retrieved coefficient values.

As a result, the PTI converter 10 implementing equations (17) and (18) and the ITP converter 20 implementing equations (19) and (20) provide the restoration of the full vertical resolution corresponding to a progressive video signal from a conventional interlaced video source produced by any progressive film scanner or other similar device where at least one of the horizontal scan lines have been repeated or replaced with a constant value.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A converter for converting a progressive video signal to an interlaced video signal comprising:
   a preprocessor for generating replacement scan line data and for replacing at least one of the progressive horizontal scan lines with the replacement scan line data, wherein one of the scan lines is made identical to one of its preceding and succeeding scan lines where the one of the preceding and succeeding scan lines is the replacement scan line data and;
   converter means for converting the progressive video signal to the interlaced video signal.

2. The converter according to claim 1, wherein the interlaced video signal includes an even field and an odd field, and the converting means further includes means for producing the interlaced video signal using equations:

$$u(k)=(y(2k)+y(2k+1))/2$$

for the odd field and k=0,1, . . . , n/2−1;

$$v(k)=y(2k+1)+y(2k+2))/2$$

for the even field and k=0,1, . . . , n/2−1 where y is a horizontal scan line in a frame of the progressive video signal, u is a horizontal scan line for the odd field, and v is a horizontal scan line for the even field.

3. The converter according to claim 1, wherein the interlaced video signal includes an even field and an odd field and the converting means further includes means for producing the interlaced video signal using equations:

$$u(k-1)=(y(2k-2)/4+y(2k-1)/2+y(2k)/4)$$

for the odd field and k=1, . . . , n/2−1

$$v(k-1)=(y(2k-1)/4+y(2k)/2+y(2k+1)/4)$$

for the even field and k=1, . . . , n/2−1 where y is a horizontal scan line in a frame of the progressive video signal, u is a horizontal scan line for the odd field, and v is a horizontal scan line for the even field.

4. The converter according to claim 1, wherein the converter means further includes (1) means for using conversion parameters for converting the progressive video signal to the interlaced video signal and (2) means for adding data representing the conversion parameters to the interlaced video signal.

5. The converter according to claim 1 further comprising means for including a data signal in the interlaced video signal which indicates that the progressive video signal can be recovered from the interlaced video signal.

6. The converter according to claim 1 further comprising means for including a data signal in the interlaced video signal which includes information about the replacement scan line data.

7. The converter according to claim 6 wherein the data signal includes the replacement scan line data.

8. A converter for converting an interlaced video signal having interlaced horizontal scan lines to a progressive video signal having progressive horizontal scan lines, the converter comprising:
   retrieving means for retrieving replacement scan line data where the replacement scan line data corresponds to one of the progressive horizontal scan lines; and
   converting means for converting the interlaced video signal to the progressive video signal using the replacement scan line data, wherein the interlaced video signal includes an even field and an odd field and the converting means further includes means for producing the progressive video signal using forwarded recursive equations:

$$y(2j+1)=2u(j)-y(2j)$$

where j=J, J+1, ... , n/2−1

$$y(2(j+1))=2(v(j)-u(j))+y(2j)$$

where j=J, J+1, ... , n/2−1; and backward recursive equations:

$$y(2j-1)=2v(j-1)-y(2j)$$

where j=J, J−1, ... , 1

$$y(2(j-1))=2(u(j-1)-v(j-1))+y(2j)$$

where j=J, J−1, ... , 1
where y is a horizontal scan line in a frame of the progressive video signal, u is a horizontal scan line for the odd field, v is a horizontal scan line for the even field, and y(2j) is known.

9. The converter according to claim 8, wherein the interlaced video signal includes an even field and an odd field, the progressive video signal includes a frame having even scan lines and odd scan lines, and the converting means further includes means for producing the progressive video signal using equations:

$$y(2k)=4u(k-1)-y(2k-2)-2y(2k-1)$$

for the even scan lines and k=1, ... , n/2

$$y(2k+1)=4v(k-1)-8u(k-1)+2y(2k-2)+3y(2k-1)$$

for the odd scan lines and k=1, ... , n/2
where y is a horizontal scan line in a frame of the progressive video signal, u is a horizontal scan line for the odd field, v is a horizontal scan line for the even field, and y(0) and y(1) are known.

10. The converter according to claim 8 wherein the interlaced video signal includes a data signal that identifies the replacement scan line data from the other ones of the horizontal scan lines and the converter further comprises means for retrieving the data signal from the interlaced video signal.

11. The converter according to claim 8 wherein the interlaced video signal includes a data signal which represents conversion parameters and the converting means is further for converting the interlaced video signal to the progressive video signal using the conversion parameters.

12. A system converter for converting a progressive video signal having progressive horizontal scan lines to an interlaced video signal having interlaced horizontal scan lines and for converting the interlaced video signal to the progressive video signal, the system comprising:
a preprocessor for generating replacement scan line data and for replacing at least one of the progressive horizontal scan lines with the replacement scan line data, wherein one of the scan lines is made identical to one of its preceding and succeeding scan lines where the one of the preceding and succeeding scan lines is the replacement scan line data;
first converter means for converting the progressive video signal to the interlaced video signal;
retrieving means for retrieving the replacement scan line data; and
second converting means for converting the interlaced video signal to the progressive video signal using the replacement scan line data, wherein the interlaced video signal includes an even field and an odd field and the converting means further includes means for producing the progressive video signal using forwarded recursive equations:

$$y(2j+1)=2u(j)-y(2j)$$

where j=J, J+1, ... , n/2−1

$$y(2(j+1))=2(v(j)-u(j))+y(2j)$$

where j=J, J+1, ... , n/2−1; and backward recursive equations:

$$y(2j-1)=2v(j-1)-y(2j)$$

where j=J, J−1, ... , 1

$$y(2(j-1))=2(u(j-1)-v(j-1))+y(2j)$$

where j=J, J−1, ... , 1
where y is a horizontal scan line in a frame of the progressive video signal, u is a horizontal scan line for the odd field, v is a horizontal scan line for the even field, and y(2j) is known.

13. A method for converting a progressive video signal to an interlaced video signal where the progressive video signal includes progressive horizontal scan lines, the method comprising the steps of:
(a) generating replacement scan line data;
(b) replacing at least one of the progressive horizontal scan lines with the replacement scan line data, wherein there are n of the progressive scan lines and n is greater then zero and the replacement scan line data is one of the progressive horizontal scan lines; and
(c) converting the progressive video signal to the interlaced video signal by combining data from adjacent scan lines in the progressive video signal, and replacing a k-th progressive horizontal scan line of the progressive horizontal scan lines with the replacement scan line data where $0 \leq k \leq n$.

14. A method for converting an interlaced video signal having interlaced horizontal scan lines to a progressive video signal having progressive horizontal scan lines, the method comprising the steps of:
(a) retrieving replacement scan line data where the replacement scan line data corresponds to one of the progressive horizontal scan lines; and
(b) converting the interlaced video signal to the progressive video signal using the replacement scan line data, wherein the interlaced video signal includes an even field and an odd field and the step of converting further includes the step of producing the progressive video signal using forwarded recursive equations:

$$y(2j+1)=2u(j)-y(2j)$$

where j=J, J+1, ... , n/2−1

$$y(2(j+1))=2(v(j)-u(j))+y(2j)$$

where j=J, J+1, ... , n/2−1; and backward recursive equations:

$$y(2j-1)=2v(j-1)-y(2j)$$

where j=J, J−1, . . . , 1

$$y(2(j-1))=2(u(j-1)-v(j-1))+y(2j)$$

where j=J, J−1, . . . , 1 where y is a horizontal scan line in a frame of the progressive video signal, u is a horizontal scan line for the odd field, v is a horizontal scan line for the even field, and y(2j) is known.

15. The method according to claim 14, wherein the interlaced video signal includes an even field and an odd field, the progressive video signal includes a frame having even scan lines and odd scan lines, and the step of converting further includes the step of producing the progressive video signal using equations:

$$y(2k)=4u(k-1)-y(2k-2)-2y(2k-1)$$

for the even scan lines and k=1, . . . , n/2

$$y(2k+1)=4v(k-1)-8u(k-1)+2y(2k-2)+3y(2k-1)$$

for the odd scan lines and k=1, . . . , n/2 where y is a horizontal scan line in a frame of the progressive video signal, u is a horizontal scan line for the odd field, v is a horizontal scan line for the even field, and y(0) and y(1) are known.

16. The method according to claim 14, wherein the interlaced video signal includes a data signal that identifies the replacement scan line data from the other ones of the horizontal scan lines and the converter further comprises means for retrieving the data signal from the interlaced video signal.

* * * * *